United States Patent [19]

Murakami et al.

[11] Patent Number: 5,096,224
[45] Date of Patent: Mar. 17, 1992

[54] THROUGH ANCHOR FOR SEAT BELT SYSTEM

[75] Inventors: Takashi Murakami, Sagamihara; Eiji Konno, Fujisawa, both of Japan

[73] Assignee: Nippon Seiko Kabushiki Kaisha, Tokyo, Japan

[21] Appl. No.: 607,535

[22] Filed: Nov. 1, 1990

[30] Foreign Application Priority Data

Nov. 10, 1989 [JP] Japan .............................. 1-130520[U]

[51] Int. Cl.[5] .............................................. B60R 22/00
[52] U.S. Cl. ................................... 280/808; 280/801; 280/803; 297/482; 297/483
[58] Field of Search ............... 280/801, 804, 806, 808, 280/803; 24/163 R, 163 FC, 164, 198, 199; 297/482, 483, 488

[56] References Cited

U.S. PATENT DOCUMENTS

| | | | |
|---|---|---|---|
| 4,281,853 | 8/1981 | LeVeux | 280/804 |
| 4,642,853 | 2/1987 | Plesniarski et al. | 280/804 |
| 4,848,796 | 7/1989 | Escaravage | 280/804 |

FOREIGN PATENT DOCUMENTS 58-37406  8/1983  Japan .

Primary Examiner—Kenneth R. Rice
Attorney, Agent, or Firm—Wegner, Cantor, Mueller & Player

[57] ABSTRACT

A through anchor suitable for use in a seat belt system is disclosed. In use, the through anchor is mounted by way of a through bore formed in a fixing member arranged on a side of a vehicle body. The through anchor comprises a metal plate, a fixing bolt, a resin covering and an internally-threaded member. The metal plate defines therein a through hole and a webbing slot. The fixing bolt has a head portion, a threaded portion and a base portion. The resin covering is molded as an integral member on a surface of the head portion of the fixing bolt and a surface of the metal plate. The internally-threaded member has a cylindrical portion and a flange portion extending radially and outwardly from the cylindrical portion. In use, the internally-threaded member is threadedly mounted on the fixing bolt with the fixing member interposed therebetween, the cylindrical portion extends through the bore and encloses therein the threaded portion of the fixing bolt, and the flange portion holds in place the fixing bolt relative to the direction of an axis of said fixing bolt.

5 Claims, 4 Drawing Sheets

THROUGH ANCHOR FOR SEAT BELT SYSTEM

BACKGROUND OF THE INVENTION (a) Field of the Invention

The present invention relates to an improvement to a through anchor suitable for use in a seat belt system, said through anchor defining therethrough a slot for deflecting an associated webbing so as to guide the webbing to a predetermined position.

(b) Description of the Related Art

Seat belt systems for safely holding an occupant or the like in a seat of a vehicle include 3-point seat belt systems which makes use of a continuous webbing.

For example, as shown in FIG. 5 which is a schematic illustration of a structure for mounting a through anchor of a seat belt system on a vehicle body, an end portion of a webbing 10 is secured in a retractor 25 arranged in a rear part of a door interior, and an opposite end portion of the webbing extends through a through anchor 17 mounted on a rear end portion of a door sash 11 and then through a through tongue plate 31 latched in an emergency release buckle (not shown) provided upright at a substantially central part of the vehicle body and is fastened to an anchor plate 29 disposed in a lower part of the door interior. Accordingly, when the door is opened, the webbing 10 is wound out from the retractor 25 and extends between the through tongue plate 31 and the anchor plate 29 and also between the through tongue plate 31 and the through anchor 17, so that the webbing 10 is pulled away from a seat 27 to permit entrance or egress of an occupant. When the door is closed on the other hand, the webbing 10 is wound into the retractor 25 so that the upper torso of the occupant in the seat 27 is automatically restrained by the webbing 10.

The through anchor 17 mounted on the rear end portion of the door sash 11 is also provided to optimize the holding of the right shoulder of the occupant by the shoulder webbing. The direction of the webbing 10 is changed at the slot of the through anchor 17.

As depicted in FIG. 4 by way of example, the through anchor 17 is composed of a support plate 18, which is pivotally supported by a rivet 32 on a fixing member 20 provided on the rear end portion of the door sash 11, and a through ring 19 having a slot through which the webbing extends.

Since the through anchor 17 is pivotally supported by the rivet 32 as described above, there is the potential danger that a head portion of the rivet projects out from the surface of the support member and the occupant may hooked and injured by the projecting head portion.

To eliminate the above potential danger, the support plate 18 is enclosed in a resin cover 21 shown in FIG. 4. The resin cover 21 is molded as a unitary member with a synthetic resin and includes a first portion 22 covering one side of the support plate 18 and a second portion 23 extending over the other side of the support plate 18. The first portion 22 and the second portion 23 are connected together via a hinge portion 33. The first portion 22 has lugs 36,36, while the second portion 23 defines recesses 37,37 engageable with the corresponding lugs 36,36. Each of the first and second portions 22,23 also has a hook 34 engageable with a corresponding detent 35 of the support plate 18 and recesses 24,24 for receiving the through ring 19 therein. These recesses 37,37, lugs 36,36, hooks 34,34, and recesses 24,24,24,24 are all formed at the same time as the resin cover 21 is molded.

Either one of the first and second portions 22,23 of the resin cover 21 is inserted through the through ring 19 and the lugs 36,36 are brought into engagement with the corresponding recesses 37,37. As a result, the resin cover 21 can cover both the sides of the support plate 18. The resin cover 21 can therefore avoid the potential danger that an occupant may contact a projecting or recessed part such as a pivot portion of the support plate 18 or the rivet 32 and could be injured by such a projecting or recessed part.

However, enclosure of a support member for a through anchor within a resin cover such as that described above involves the problems that the overall thickness of the support member increases to result in protrusion of the resin cover into the room of the vehicle, thereby impairing the appearance and the efficiency of assembly work of the seat belt is reduced due to the need for the additional step for mounting the resin cover.

SUMMARY OF THE INVENTION

An object of the present invention is therefore to overcome the above problems and to provide an economical through anchor for a seat belt system, said through anchor having attractive external appearance and permitting high assembling work efficiency.

In one aspect of the present invention, there is thus provided a through anchor suitable for use in a seat belt system in such a way that said through anchor is mounted by way of a through bore formed in a fixing member arranged on a side of a vehicle body. The through anchor comprises:

a metal plate defining therein a through hole and a slot through which a webbing may extend;

a fixing bolt for extending through said throughbore, said fixing bolt having a head portion, a threaded portion and a base portion whose cross-sectional shape is such that said fixing bolt is prevented from rotation in said through hole of said metal plate when said base portion is fitted in said through hole;

a resin covering molded as an integral member on a surface of said head portion of said fixing bolt and a surface of said metal plate; and an internally-threaded member for being threadedly mounted on said fixing bolt with said fixing member interposed therebetween, said internally-threaded member having a cylindrical portion and a flange portion extending radially and outwardly from said cylindrical portion, and, in use, said cylindrical portion extending through said through bore and enclosing therein said thread portion of said fixing bolt and said flange portion holding in place said fixing bolt relative to the direction of an axis of said fixing bolt.

According to the through anchor of the present invention, the head portion of the fixing bolt which is fixed unrotatably on the metal plate and extends through the through bore of the fixing member is covered by the resin covering molded as an integral member on the surface of the metal plate. Further, the fixing bolt is held in such a way that the threaded portion extending through the through bore is covered by the cylindrical portion of the internally-threaded member as described above and the threaded portion is subjected to axial tightening force from the internally-threaded member. As a result, the rotatable through anchor can be easily and surely mounted on the vehicle body.

Projections on and recesses in the surfaces of the metal plate, such as the head portion of the fixing bolt, are covered by the resin covering. It is therefore possible to prevent possible contact of an occupant to such projections on or recesses in the surfaces of the metal plate and hence to protect him from injury. In addition, the external appearance can be designed into an attractive form without unnecessarily increasing the thickness. Further, the through anchor is pivotally mounted on the vehicle body by the internally-threaded member so that the through anchor is allowed to undergo stable swinging motion and also to function properly. It is also mentioned that the through anchor of the present invention can be easily assembled.

The present invention has therefore provided an economical through anchor for use in a seat belt system, which through anchor has a good external appearance and permits easy assembly work.

BRIEF DESCRIPTION OF THE DRAWINGS

The above and other objects, features and advantages of the present invention will become from the following description and the appended claims, taken in conjunction with the accompanying drawings, in which:

FIG. 4 is a fragmentary perspective view of a

DETAILED DESCRIPTION OF THE INVENTION AND PREFERRED EMBODIMENTS

One embodiment of the present invention will hereinafter be described in detail on the basis of the accompanying drawings.

Figure 1:
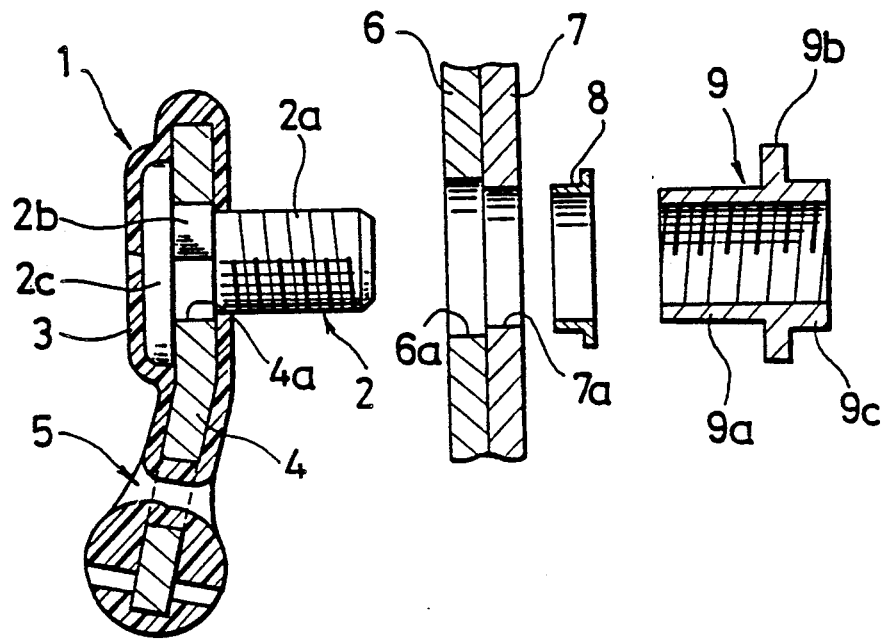
FIG. 1 is an exploded cross-sectional view of a through anchor according to one embodiment of the present invention, which through anchor is suitable for use in a seat belt system.
Figure 2:
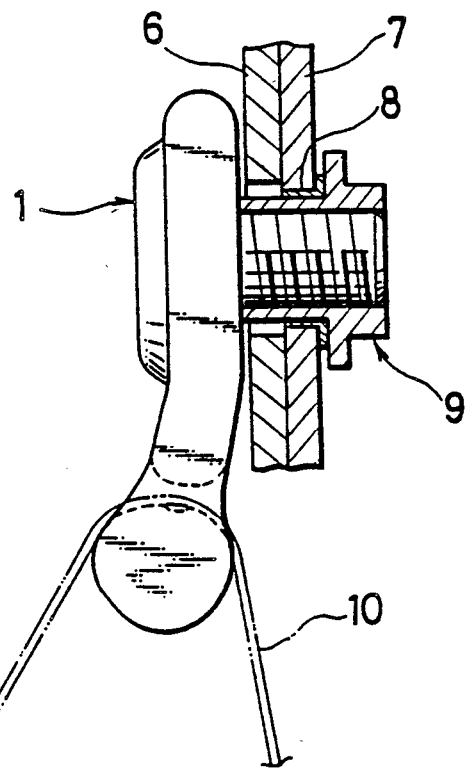
FIG. 2 is a fragmentary and partly cross-sectional view of the assembled through anchor of FIG.
Figure 3:
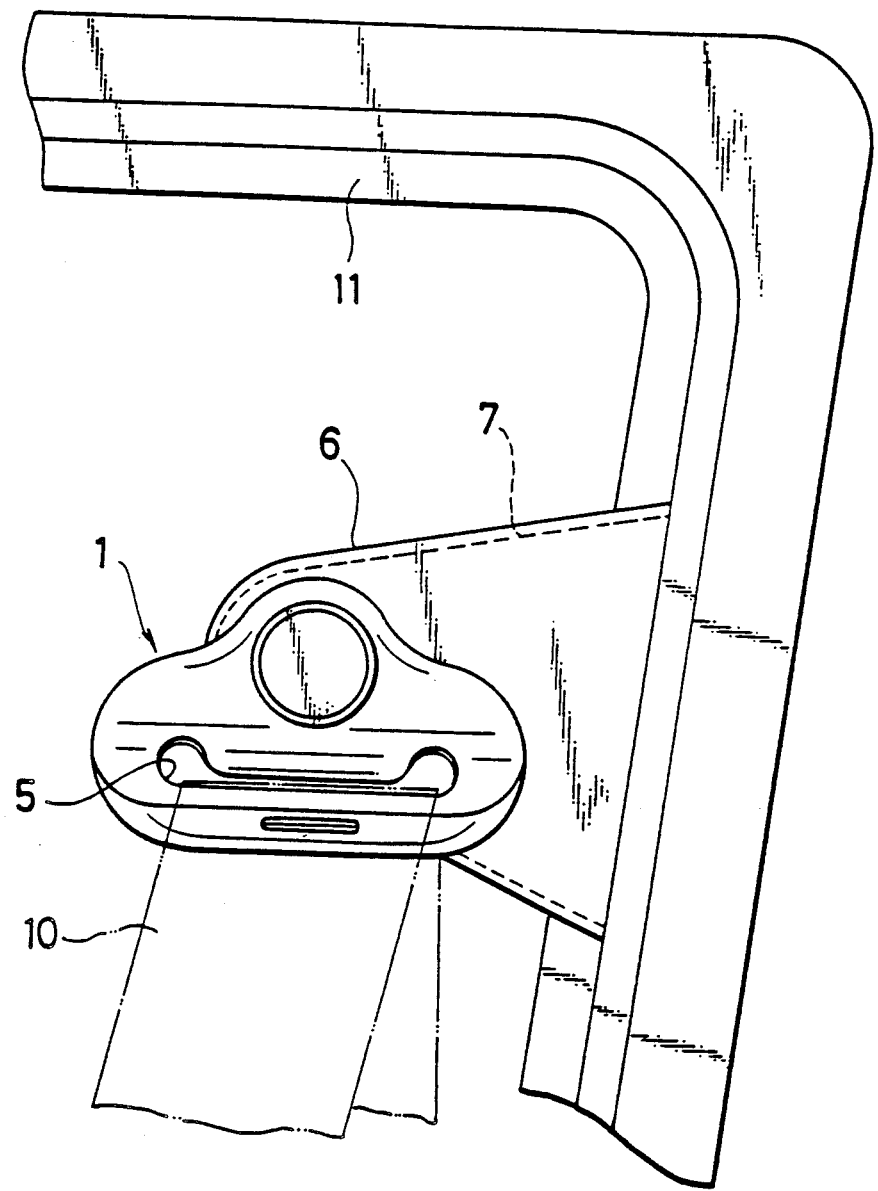
FIG. 3 is a front elevation showing the mounted state of the through anchor depicted in FIG. 1.
Figure 4A:
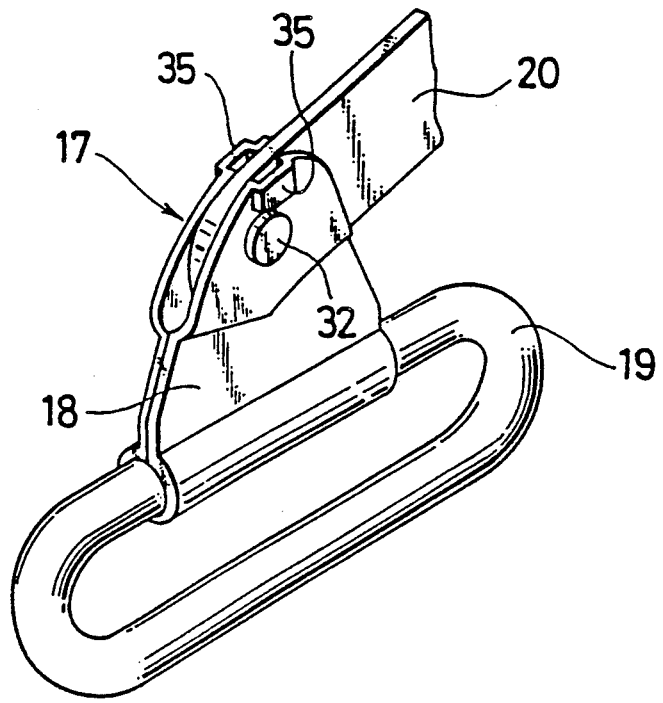
Figure 4B:
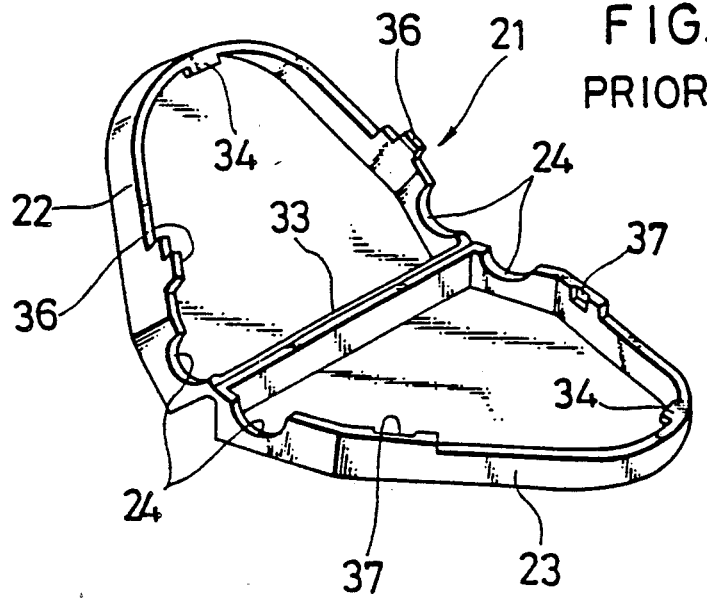
Figure 5:
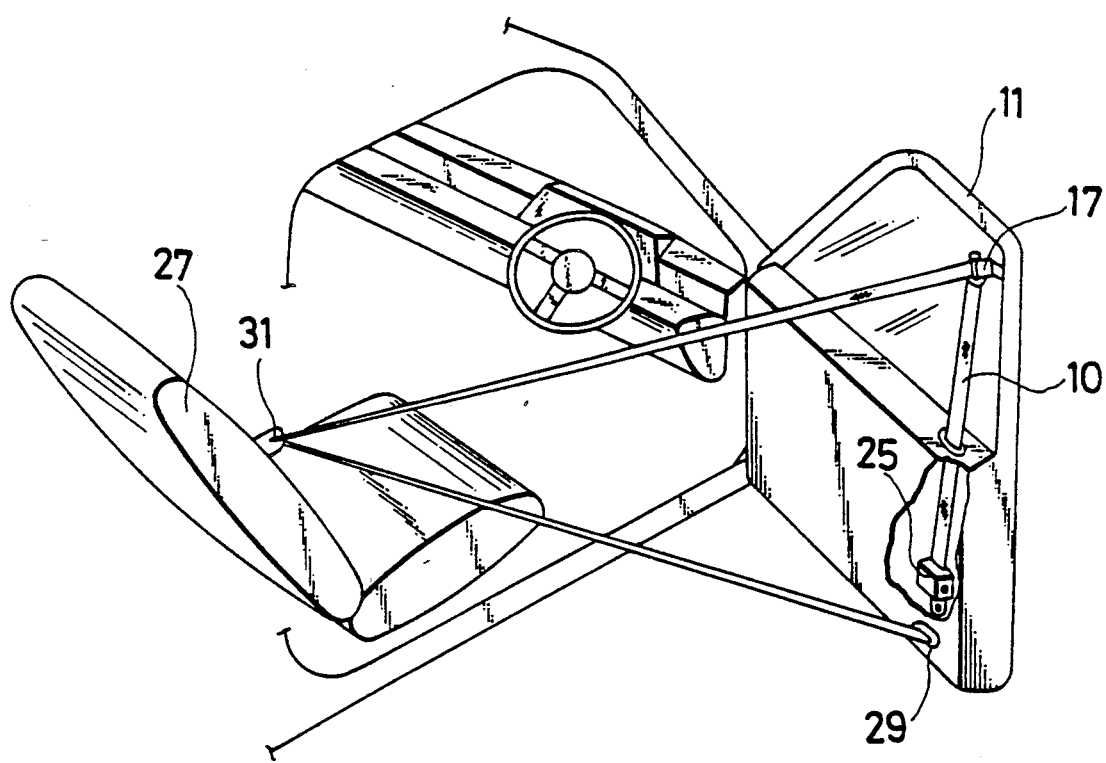
FIG. 5 is a schematic illustration of a structure for mounting a through anchor of a seat belt system on a vehicle body.

A through anchor 1 shown in FIGS. 1-3, which is suitable for use in a seat belt system, is composed of a metal plate 4 and a fixing bolt attached to the metal plate 4. An outer surface of the through anchor 1 is covered by a resin covering 3 molded as a unitary member.

A rectangular through hole 4a is formed in an upper end portion of the metal plate 4. The fixing bolt 2 having a base portion 2b of a rectangular crosssection corresponding to the through hole 4a is fitted in the through hole 4a in such a way that the fixing bolt 2 is prevented from rotation inside the through hole 4a. A head portion 2c is also formed in adjacent to the base portion 2b of the fixing bolt 2, whereby the fixing bolt 2 is prevented from dropping from the metal plate 4 in the rightward direction as seen in FIG. 1. Further, on a side of a free end of the metal plate 4, another slot is formed as a webbing slot through which a webbing 10 extends.

When the resin covering 3 is molded as a unitary member with a synthetic resin material in such a way that the resin covering 3 covers the outer surface of the metal plate 4, all projections on and recesses in the outer surface of the metal plate 4—such as the head portion 2c of the fixing bolt 2—are covered under the resin covering 3. It is therefore possible to prevent an occupant from contacting such projections on or recesses in the outer surface of the metal plate 4, whereby the occupant is protected from injury. Furthermore, the resin covering 3 makes it possible to provide an attractive design or appearance without unnecessarily increasing the thickness of the through anchor. In addition, the edges of the webbing slot 5 are covered with the resin covering 3, thereby reducing the frictional resistance of the lower edge on which the webbing 10 slides.

A description will next be made of a mounting method of the through anchor 1.

For example, the through anchor 1 is pivotally fixed on a metal-made fixing member 7 secured on a rear end portion of a door sash 11 as illustrated in FIG. 3.

A resin-made cover 6 is provided on an inboard side of the fixing member 7. A threaded portion 2a of the fixing bolt 2 extends through both through bores 6a,7a which are formed in the cover 6 and fixing member 7, respectively. An internally-threaded member 9 is inserted in the through bores 6a,7a, with a bushing 8 which is fitted in the through bore 7a of the fixing member 7 being interposed between the internally-threaded member 9 and the edge of the through bore 7a. The internally-threadedly member 9 is therefore tightened on the threaded portion 2a of the fixing bolt 2.

The internally-threaded member 9 is composed of a cylindrical portion 9a, a flange portion 9b and a nut portion 9c. The cylindrical portion 9a extends through both the through bores 7a,6a of the fixing member 7 and cover 6 and covers the threaded portion 2a of the through anchor 1. The flange portion 9b extends radially and outwardly from the outer wall of the cylindrical portion 9a. The nut portion 9a has an equilateral and equiangular hexagonal profile and defines internal threads. In the inner wall of the cylindrical portion 9a, there are formed internal threads in continuation with the internal threads of the nut portion 9c. The internal threads of the cylindrical portion 9a and those of the nut portion 9c are allowed to engage the threaded portion 2a of the fixing bolt 2.

When the internally-threaded member 9 is progressively tightened to a predetermined extent on the threaded portion 2a of the fixing bolt 2, the leading end of the cylindrical portion 9a is brought into contact with the outboard surface of the through anchor 1 as shown in FIG. 2, whereby the through anchor 1 and the internally-threaded member 9 are tightened together. Since the axial length of the cylindrical portion 9a of the internally-threaded member 9 is suitably determined in relation to the thickness of the fixing member 7 and that of the cover 6 and the flange portion 9b has a diameter greater than that of the through-bore 7a, the internally-threaded member 9 can pivotally hold the through anchor 1 in the through bore 7a of the fixing member 7. Further, the base portion 2b of the fixing bolt 2 is unrotatably fitted in the rectangular through hole 4a of the metal plate 4. Accordingly, upon tightening of the internally-threaded member 9 on the threaded portion 2a, it is only necessary to tighten the internally-threaded member 9 while holding the through anchor 1 itself rotation free. The assembly and mounting of the through anchor 1 is therefore simple.

Further, the tightening force by the internally-threaded member 9 is applied only to the threaded portion 2a and the outboard surface of the through anchor 1 and is not applied directly between the fixing member 7 and the flange portion 9b. This can avoid the potential problem that the internally-threaded member 9 could be caused to rotate to reduce its tightening force due to pivotal motion of the through anchor 1.

The threaded portion 2a is covered by the cylindrical portion 9a of the internally-threaded member 9 so that the threaded portion 2a does not contact the edge of the through bore 7a of the fixing member 7. This permits stable and smooth pivotal motion for the through anchor 1, whereby the through anchor 1 is allowed to function properly.

In the embodiment described above, the bushing 8 is provided to ensure the securement of the internally-threaded member 9 on the fixing member 7 and hence to permit smooth pivotal motion of the through anchor 1. It is to be noted that the bushing 8 is not an essential member.

Needless to say, the configurations of the individual members of the through anchor according to the present invention, such as the metal plate, the fixing plate, the internally-threaded member and the like, are not limited to those of the above-described embodiment, and can take various forms. For example, the configuration of the fixing bolt, especially the configuration of the flange portion of the internally-threaded member can be modified suitably on the basis of the objects of the present invention. In addition, the internally-threaded member may be equipped with an anti-loosening or locking means.

In addition, the mounting position of the through anchor is not limited to the door sash, but the through anchor can be secured to a desired position.

We claim:

1. In a combination of a through anchor and an internally-threaded member, said combination being suitable for use in a seat belt system in such a way that said through anchor is mounted by way of a through bore formed in a fixing member arranged on a side of a vehicle body, the improvement wherein said combination comprises:

a fixing bolt for extending through said through bore, said fixing bolt having a head portion, a threaded portion, and a base portion of a non-circular cross-section;

a metal plate defining therein a through hole with the base portion fitted therein and a slot through which a webbing may extend;

a resin covering molded as an integral member on a surface of said head portion of said fixing bolt and a surface of said metal plate, said fitting bolt and metal plate being in fitted engagement; and an internally-threaded member having a cylindrical portion and a flange portion, extending radially and outwardly from said cylindrical portion wherein said internally-threaded member is adapted to be threadedly mounted on said fixing bolt with said fixing member interposed therebetween so that said internally-threaded member extends through said through bore and encloses therein said threaded portion of said fixing bolt such that one end of said internally-threaded member is in contact with the through anchor, and said flange portion holds in place said fixing bolt relative to the direction of an axis of said fixing bolt.

2. The through anchor of claim 1, wherein said internally threaded member further comprises a nut portion in adjacent to said flange portion and on a side farther from said metal plate in the direction of an axis of said internally-threaded member, whereby said internally-threaded member can be tightened on said fixing bolt.

3. The through anchor of claim 1, further comprising a bushing to be placed between said cylindrical portion of said internally-threaded member and said through bore of said fixing member.

4. The through anchor of claim 1, wherein said cylindrical portion of said internally-threaded member has a length greater than the thickness of said fixing member.

5. The through anchor of claim 1, wherein said flange portion of said internally-threaded member has an outer diameter greater than the diameter of said through bore of said fixing member.

* * * * *